United States Patent
Yamamoto et al.

(10) Patent No.: US 6,469,836 B1
(45) Date of Patent: Oct. 22, 2002

(54) EYEPIECE

(75) Inventors: Chikara Yamamoto, Omiya (JP); Hitoshi Miyano, Omiya (JP)

(73) Assignee: Fuji Photo Optical Co., Ltd., Saitama (JP)

(*) Notice: Subject to any disclaimer, the term of this patent is extended or adjusted under 35 U.S.C. 154(b) by 28 days.

(21) Appl. No.: 09/606,689

(22) Filed: Jun. 30, 2000

(30) Foreign Application Priority Data

Jul. 12, 1999 (JP) ............................................ 11-197697

(51) Int. Cl.[7] .............................................. G02B 25/00
(52) U.S. Cl. ...................................................... 359/646
(58) Field of Search ............................... 359/643–646, 359/558

(56) References Cited

U.S. PATENT DOCUMENTS 6,130,785 A * 10/2000 Abe et al. .................... 359/646

OTHER PUBLICATIONS

Japanese Patent Office, Patent Abstracts of Japan, Publication No. 03059511 A, Date of Publication: Mar. 14, 1991, Application No. 01193998, Date of Filing: Jul. 28, 1989, pp. 67 –75 (English translation of Abstract).

* cited by examiner

Primary Examiner—Jordan M. Schwartz
(74) Attorney, Agent, or Firm—Snider & Associates; Ronald R. Snider

(57) ABSTRACT

An eyepiece comprises, successively from the eye side, a first lens $L_1$, which is a diffractive optical element with a diffractive optical surface on the object side, made of a biconvex lens having a surface with a greater curvature directed onto the eye side; and a second lens $L_2$, which is a diffractive optical element with a diffractive optical surface on the eye side, made of a meniscus lens with a positive refracting power having a convex surface directed onto the eye side. Both of the diffractive optical elements satisfy the following conditional expression (1):

$$E < 0 \qquad (1)$$

where E is the coefficient of the quadratic term of the phase difference function.

2 Claims, 5 Drawing Sheets

EXAMPLE 1

EXAMPLE 1

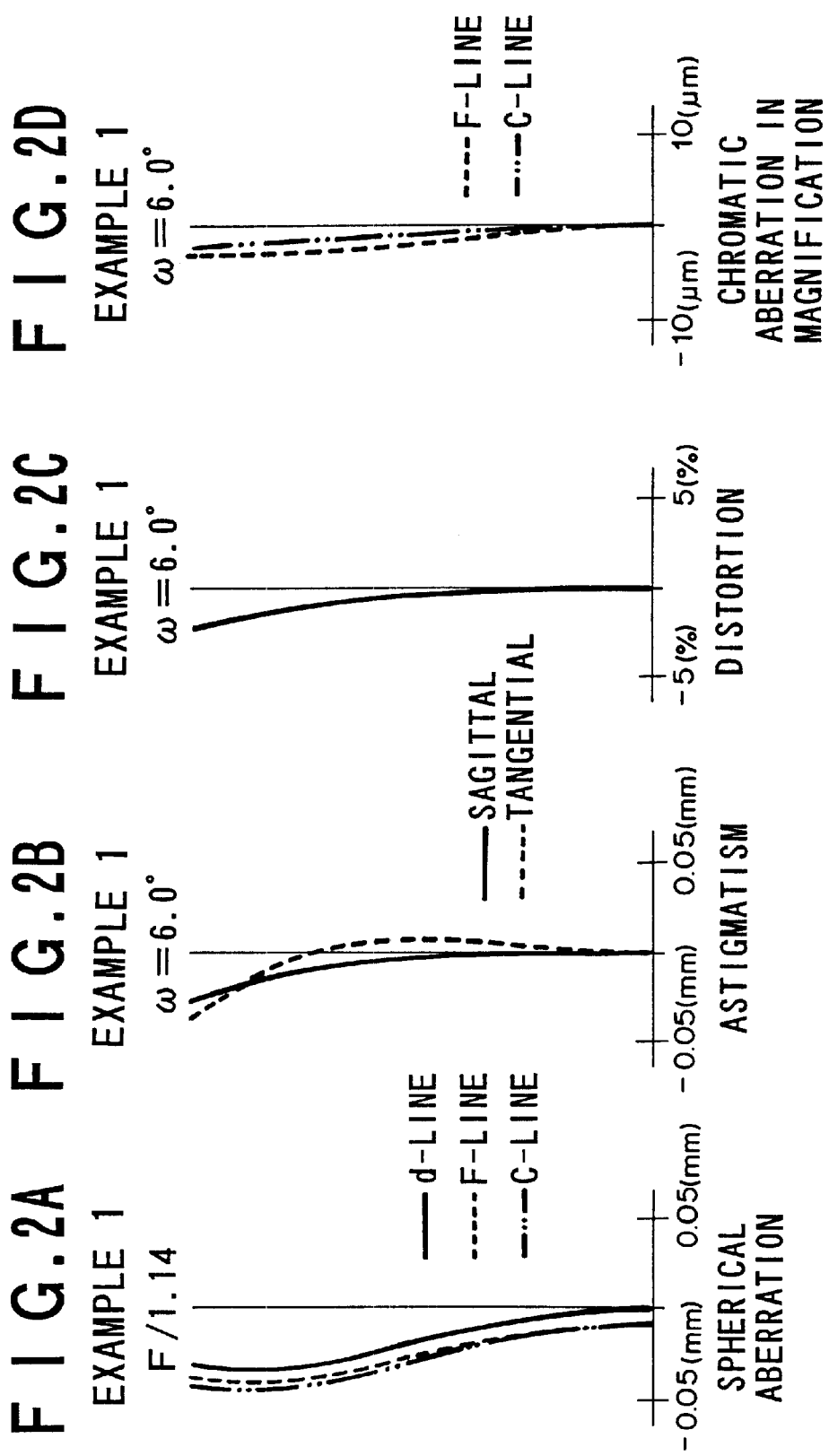

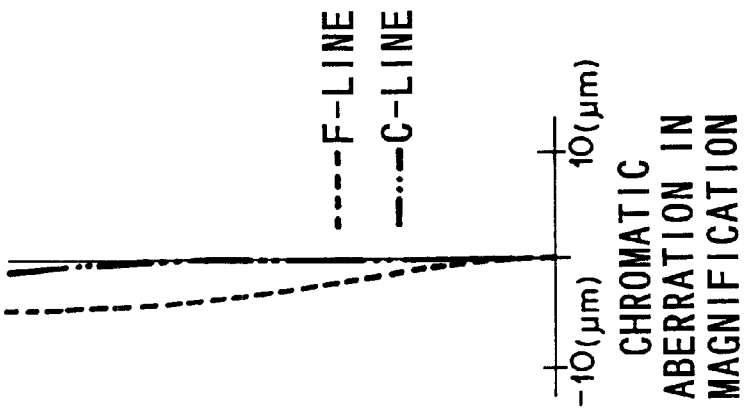
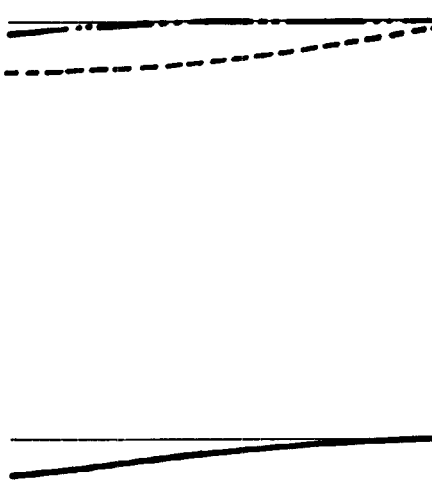
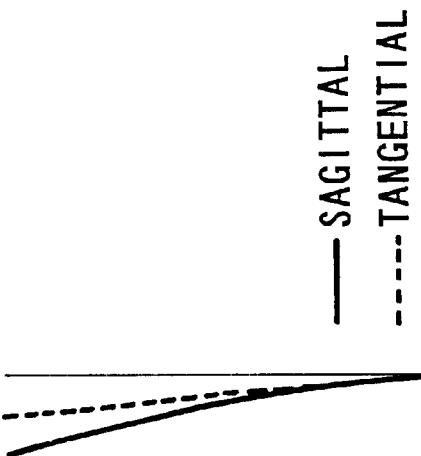
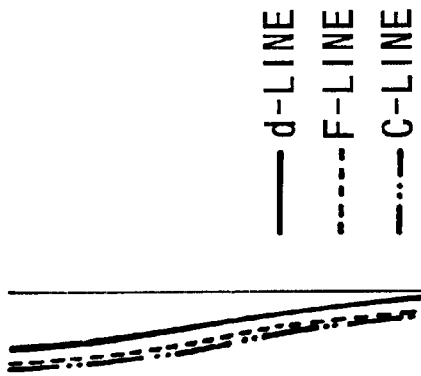

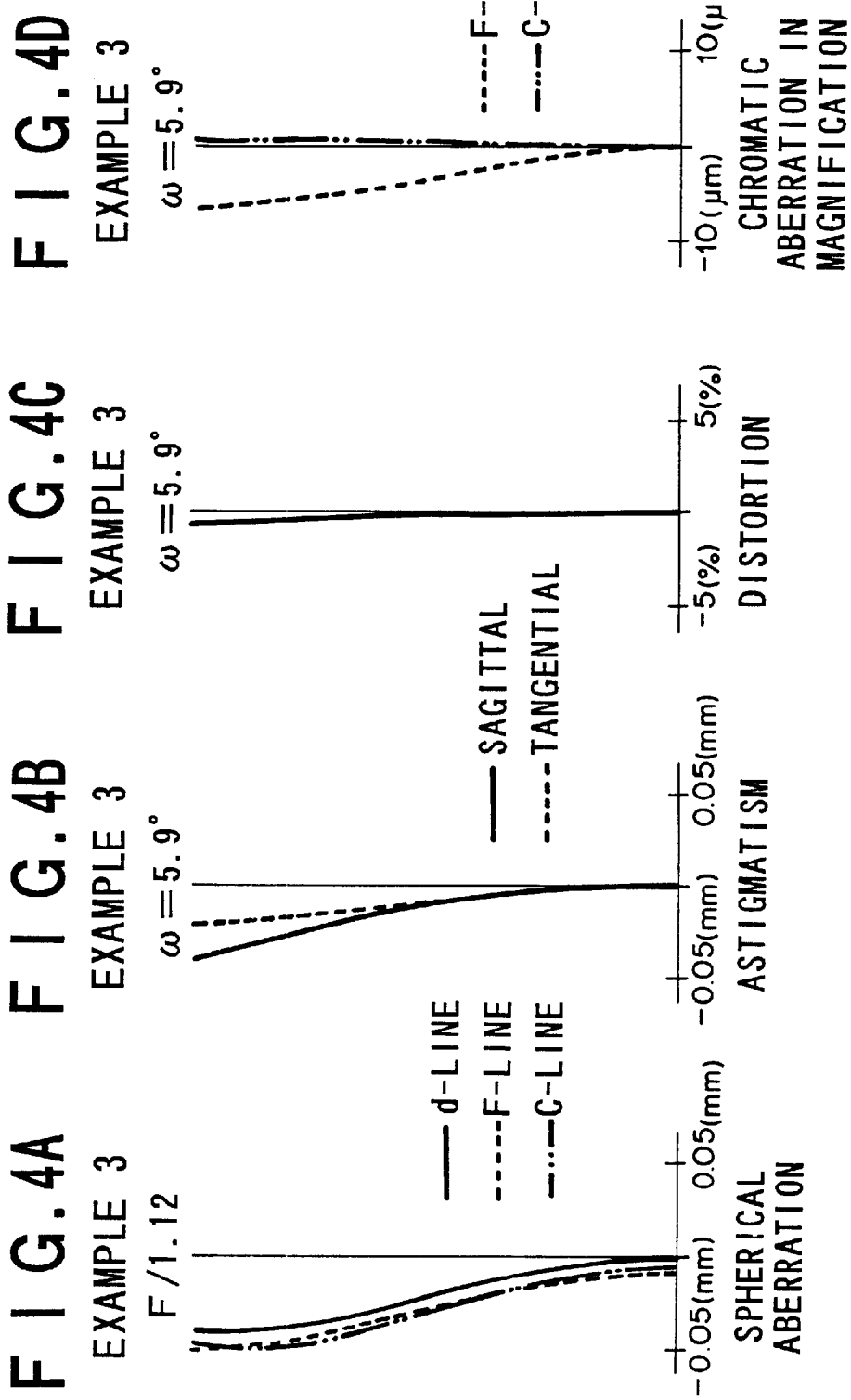

FIG.5A EXAMPLE 4 F/1.12

— d-LINE
---- F-LINE
-·- C-LINE

SPHERICAL ABERRATION
-0.05(mm) to 0.05(mm)

FIG.5B EXAMPLE 4 ω=5.9°

— SAGITTAL
---- TANGENTIAL

ASTIGMATISM
-0.05(mm) to 0.05(mm)

FIG.5C EXAMPLE 4 ω=5.9°

DISTORTION
-5(%) to 5(%)

FIG.5D EXAMPLE 4 ω=5.9°

---- F-LINE
-·- C-LINE

CHROMATIC ABERRATION IN MAGNIFICATION
-10(μm) to 10(μm)

EYEPIECE

RELATED APPLICATIONS

This application claims the priority of Japanese Patent Application No. 11-197697 filed on Jul. 12, 1999, which is incorporated herein by reference.

BACKGROUND OF THE INVENTION

1. Field of the Invention

The present invention relates to an eyepiece; and, in particular, to an eyepiece suitably usable for endoscopes.

2. Description of the Prior Art

As an eyepiece in endoscopes, one disclosed in Japanese Unexamined Patent Publication No. 3-59511 has conventionally been known, for example. For making this eyepiece more particularly suitable for endoscopes than are typical eyepieces, it has a greater eyepiece magnification and a longer distance (eye-point distance) from the eyepiece to the pupil position of the viewer. As a consequence, though images have a very small size at the end face of optical fiber bundle in the front end part of an endoscope, it can be observed as a large image which is easy to view, whereby inspections and analyses become easier to carry out. Also, the system of this eyepiece is constituted by three lens elements, so that the eyepiece as a whole can be made smaller with a lighter weight at a lower cost.

Recently, as endoscopes have come into wider use, demands for smaller size, lighter weight, and lower cost have become stronger. In the above-mentioned conventional eyepiece, however, it is very difficult to further reduce the number of lens elements since its performances may be greatly deteriorated thereby in terms of power arrangement and chromatic aberration.

SUMMARY OF THE INVENTION

In view of such circumstances, it is an object of the present invention to provide an eyepiece comprising a lens equipped with a diffractive optical surface (hereinafter referred to as diffractive optical element: DOE), which lens has been coming into use in various fields, thereby not only achieving further smaller size, lighter weight, and lower cost, but also being able to correct various kinds of aberration such as chromatic aberration in particular.

The eyepiece in accordance with the present invention comprises first and second lenses, each made of a positive lens having a convex surface directed onto an eye side, at least one of the first and second lenses being formed from a diffractive optical element.

Preferably, in the eyepiece in accordance with the present invention, at least one diffractive optical surface constituting the diffractive optical element satisfies the following conditional expression (1):

$$E < 0 \qquad (1)$$

where E is the coefficient of the quadratic term of the phase difference function.

The eyepiece in accordance with the present invention may be configured such that, among the lens surfaces of the first and second lenses, both of surfaces opposing each other between the first and second lenses are formed as diffractive optical surfaces.

BRIEF DESCRIPTION OF THE DRAWINGS

FIGS. 2A to 2D are aberration charts of the eyepiece in accordance with Example 1;

FIGS. 3A to 3D are aberration charts of the eyepiece in accordance with Example 2;

FIGS. 4A to 4D are aberration charts of the eyepiece in accordance with Example 3; and FIGS. 5A to 5D are aberration charts of the eyepiece in accordance with Example 4.

DESCRIPTION OF THE PREFERRED EMBODIMENTS

Figure 1:
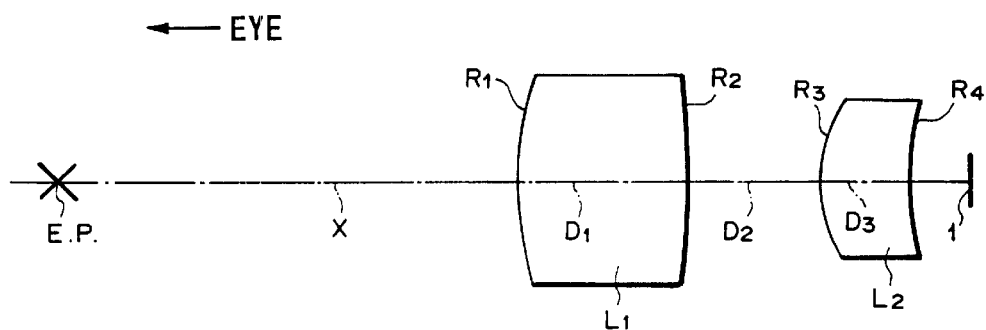
FIG. 1 is a view showing the configuration of the eyepiece in accordance with Example 1.

In the following, specific embodiments of the present invention will be explained with reference to the drawings.

The eyepiece of the embodiment shown in FIG. 1 (illustrating that of Example 1 as a representative) is constituted by, successively from the eye side, a first lens $L_1$ made of a biconvex lens having a surface with a greater curvature directed onto the eye side, and a second lens $L_2$ made of a meniscus lens with a positive refracting power having a convex surface directed onto the eye side. At least one of the first lens $L_1$ and second lens $L_2$ is formed from a diffractive optical element. The eyepiece is used for viewing an image at an object image position 1 formed by an objective lens (not shown).

The form of the diffractive optical surface constituting the diffractive optical surface is represented by the following aspheric surface form expression and phase difference functional expression for diffractive optical surface.

The aspheric surface form expression for diffractive optical surface is:

$$Z = \frac{\frac{Y^2}{R}}{1 + \sqrt{1 - K\frac{Y^2}{R^2}}} + AY^4 + BY^6 + CY^8 + DY^{10}$$

where

Z is the length of the perpendicular to a tangential plane (plane perpendicular to the optical axis) of an apex of the aspheric surface from a point on the aspheric surface having a height Y from the optical axis;

Y is the height from the optical axis;

K is the eccentricity;

R is the paraxial radius of curvature of the aspheric surface; and

A, B, C, and D are aspheric surface coefficients.

The phase difference functional expression for diffractive optical surface is:

$$\Phi(Y) = EY^2 + FY^4 + GY^6 + HY^8 + IY^{10}$$

where $\Phi(Y)$ is the phase difference function of the diffractive optical surface;

Y is the height from the optical axis; and

E, F, G, H, and I are coefficients of the phase difference function.

Here, the diffractive optical surface optical path difference function defining the actual optical path caused by the diffractive optical surface is expressed by $\lambda \times \Phi(Y)/2\pi$, where $\lambda$ is the wavelength and $\Phi(Y)$ is the diffractive optical surface phase difference function.

Also, at least one diffractive optical surface thereof satisfies the following conditional expression (1):

$$E < 0 \quad (1)$$

where E is the coefficient of the quadratic term of the phase difference function.

As compared with conventional lenses made of glass, diffractive optical elements have a greater dispersion with a different polarity, thereby being useful as optical elements which can construct high-precision optical systems while reducing the number of lens elements. In this embodiment, when a diffractive optical element is used with the form of each lens being defined as mentioned above, an eyepiece having a long eye-point distance with various kinds of aberration having been corrected can be obtained. Due a simple configuration constituted by two lens elements, the eyepiece can achieve further smaller size, lighter weight, and lower cost.

Also, due to the property of the above-mentioned diffractive optical element, the eyepiece can yield a very high performance in terms of chromatic aberration correction in particular.

The above-mentioned conditional expression (1) is one concerning chromatic aberration correction. If its upper limit is exceeded, then chromatic aberration may not be corrected sufficiently.

EXAMPLES

Examples 1 to 4 of the present invention will now be explained specifically.

Example 1

The configuration of the eyepiece in accordance with Example 1 is as explained in the above-mentioned embodiment. In this Example, the first lens $L_1$ is a diffractive optical element equipped with a diffractive optical surface on the object side, whereas the second lens $L_2$ is a diffractive optical element equipped with a diffractive optical surface on the eye side. Both of the diffractive optical surfaces satisfy the above-mentioned conditional expression (1).

Table 1 (follows) shows the radius of curvature R (mm) of each lens surface, the axial surface space of each lens (the center thickness of each lens and air space between each pair of neighboring lenses) D (mm), and the refractive index N and Abbe number ν of each lens at d-line in Example 1. Also, the lower part of Table 1 shows the respective values of constants of each diffractive optical surface set forth in the above-mentioned aspheric surface form expression and phase difference functional expression for diffractive optical surface in Example 1.

In each of Examples 1 to 4, the focal length f of the whole lens system is set at 7.35 mm, the eyepiece magnification of the whole system at 34.0, and the eye-point distance from the eyepiece to the eye point E. P. at 15 mm. In Table 1 and its subsequent tables, the numbers referring to the items therein successively increase from the eye side, whereas "*" on the left side of numbers indicates a diffractive optical surface.

Example 2

The configuration of the eyepiece in accordance with Example 2 is as explained in the above-mentioned embodiment. In this Example, each of the first lens $L_1$ and second lens $L_2$ is a diffractive optical element equipped with a diffractive optical surface on the eye side. Both of the diffractive optical surfaces satisfy the above-mentioned conditional expression (1).

Table 2 (follows) shows the radius of curvature R (mm) of each lens surface, the axial surface space of each lens (the center thickness of each lens and air space between each pair of neighboring lenses) D (mm), and the refractive index N and Abbe number ν of each lens at d-line in Example 2. Also, the lower part of Table 2 shows the respective values of constants of each diffractive optical surface set forth in the above-mentioned aspheric surface form expression and phase difference functional expression for diffractive optical surface in Example 2.

Example 3

The configuration of the eyepiece in accordance with Example 3 is also as explained in the above-mentioned embodiment. In this Example, the first lens $L_1$ is a diffractive optical element equipped with a diffractive optical surface on the eye side. This diffractive optical surface satisfies the above-mentioned conditional expression (1).

Table 3 (follows) shows the radius of curvature R (mm) of each lens surface, the axial surface space of each lens (the center thickness of each lens and air space between each pair of neighboring lenses) D (mm), and the refractive index N and Abbe number ν of each lens at d-line in Example 3. Also, the lower part of Table 3 shows the respective values of constants of the diffractive optical surface set forth in the above-mentioned aspheric surface form expression and phase difference functional expression for diffractive optical surface in Example 3.

Example 4

The configuration of the eyepiece in accordance with Example 4 is also as explained in the above-mentioned embodiment. In this Example, each of the first lens $L_1$ is a diffractive optical element equipped with a diffractive optical surface on the eye side, whereas the second lens $L_2$ is a diffractive optical element equipped with a diffractive optical surface on the object side. Both of the diffractive optical surfaces satisfy the above-mentioned conditional expression (1).

Table 4 (follows) shows the radius of curvature R (mm) of each lens surface, the axial surface space of each lens (the center thickness of each lens and air space between each pair of neighboring lenses) D (mm), and the refractive index N and Abbe number ν of each lens at d-line in Example 4. Also, the lower part of Table 4 shows the respective values of constants of each diffractive optical surface set forth in the above-mentioned aspheric surface form expression and phase difference functional expression for diffractive optical surface in Example 4.

FIGS. 2A to 5D are aberration charts showing various kinds of aberration (spherical aberration, astigmatism, distortion, and chromatic aberration in magnification) of the eyepieces in accordance with Examples 1 to 4. In these aberration charts, e) indicates the half angle of view.

As shown in FIGS. 2A to 5D, the eyepieces in accordance with Examples 1 to 4 favorably correct various kinds of aberration, such as chromatic aberration in magnification in particular.

The eyepiece of the present invention is not limited to those of the above-mentioned Examples, and can be modified in various manners. For example, the radius of curvature R and lens space (or lens thickness) D of each lens can be altered as appropriate.

Operations and effects substantially the same as those of the above-mentioned Examples can also be obtained when other lens surfaces are formed with diffractive optical surfaces.

As explained in the foregoing, since the eyepiece in accordance with the present invention comprises a predetermined diffractive optical element, it can attain further smaller size, lighter weight, and lower cost by utilizing a unique dispersion characteristic of the diffractive optical element, and can correct various kinds of aberration such as chromatic aberration in particular.

TABLE 1

EXAMPLE 1

| Surface | R | D | $N_d$ | $v_d$ |
|---|---|---|---|---|
| 1 | 12.5007 | 5.5000 | 1.5714 | 53.0 |
| *2 | −22.4380 | 4.4000 | | |
| *3 | 4.8875 | 3.0000 | 1.7725 | 49.6 |
| 4 | 9.9867 | | | |

Diffraction optical surface constants

| | K | A | B | C | D |
|---|---|---|---|---|---|
| 2$^{nd}$ surface | 1.0000 | $3.5361 \times 10^{-4}$ | $4.9227 \times 10^{-6}$ | 0.0 | 0.0 |
| | E | F | G | H | I |
| | −36.819 | $2.5518 \times 10^{-1}$ | 0.0 | 0.0 | 0.0 |
| 3$^{rd}$ surface | 1.0000 | $2.8879 \times 10^{-4}$ | $8.5753 \times 10^{-5}$ | 0.0 | 0.0 |
| | E | F | G | H | I |
| | −9.4763 | −2.0229 | 0.0 | 0.0 | 0.0 |

TABLE 2

EXAMPLE 2

| Surface | R | D | $N_d$ | $v_d$ |
|---|---|---|---|---|
| *1 | 10.5256 | 5.5000 | 1.5592 | 53.9 |
| 2 | −32.2580 | 4.9000 | | |
| *3 | 4.7619 | 3.0000 | 1.7725 | 49.6 |
| 4 | 18.7616 | | | |

Diffraction optical surface constants

| | K | A | B | C | D |
|---|---|---|---|---|---|
| 1$^{st}$ surface | 1.0000 | $-1.4052 \times 10^{-4}$ | $-2.8497 \times 10^{-6}$ | 0.0 | 0.0 |
| | E | F | G | H | I |
| | −25.574 | $-6.3083 \times 10^{-2}$ | 0.0 | 0.0 | 0.0 |
| 3$^{rd}$ surface | 1.0000 | $-1.3409 \times 10^{-4}$ | $5.0189 \times 10^{-7}$ | 0.0 | 0.0 |
| | E | F | G | H | I |
| | −5.8534 | −3.6770 | 0.0 | 0.0 | 0.0 |

TABLE 3

EXAMPLE 3

| Surface | R | D | $N_d$ | $v_d$ |
|---|---|---|---|---|
| *1 | 9.0906 | 5.5000 | 1.5592 | 53.9 |
| 2 | −27.0268 | 4.9000 | | |
| 3 | 4.7619 | 3.0000 | 1.7725 | 49.6 |
| 4 | 18.7624 | | | |

Diffraction optical surface constants

| | K | A | B | C | D |
|---|---|---|---|---|---|
| 1$^{st}$ surface | 1.0000 | $-2.1619 \times 10^{-4}$ | $-1.0554 \times 10^{-6}$ | 0.0 | 0.0 |
| | E | F | G | H | I |
| | −24.610 | $-5.1003 \times 10^{-1}$ | $2.6091 \times 10^{-2}$ | 0.0 | 0.0 |

TABLE 4

EXAMPLE 4

| Surface | R | D | $N_d$ | $v_d$ |
|---|---|---|---|---|
| *1 | 9.5233 | 5.0000 | 1.5592 | 53.9 |
| 2 | −36.3634 | 5.0000 | | |
| 3 | 4.7848 | 3.0000 | 1.7725 | 49.6 |
| *4 | 18.7818 | | | |

Diffraction optical surface constants

| | K | A | B | C | D |
|---|---|---|---|---|---|
| 1$^{st}$ surface | 1.0000 | $-1.8541 \times 10^{-4}$ | $-2.4785 \times 10^{-6}$ | 0.0 | 0.0 |
| | E | F | G | H | I |
| | −26.737 | $-6.3522 \times 10^{-2}$ | 0.0 | 0.0 | 0.0 |
| 4$^{th}$ surface | 1.0000 | $1.9516 \times 10^{-4}$ | $1.9467 \times 10^{-4}$ | 0.0 | 0.0 |
| | E | F | G | H | I |
| | −2.5296 | −23.672 | 0.0 | 0.0 | 0.0 |

What is claimed is:

1. An eyepiece comprising first and second lenses, each made of a positive lens having a convex surface directed onto an eye side, at least one of said first and second lenses being formed from a diffractive optical element, wherein, among the lens surfaces of said first and second lenses, both of surfaces opposing each other between said first and second lenses are formed as diffractive optical surfaces.

2. An eyepiece consisting of first and second lenses, each made of a positive lens having a convex surface directed onto an eye side, at least one of said first and second lens being formed from a diffractive optical element, wherein, among the lens surfaces of said first and second lenses, both of surfaces opposing each other between said first and second lenses are formed as diffractive optical surfaces.

* * * * *